(12) United States Patent
Lee et al.

(10) Patent No.: US 12,515,532 B2
(45) Date of Patent: Jan. 6, 2026

(54) APPARATUS AND METHOD FOR CONTROLLING ELECTRIC VEHICLE INCLUDING TWIN CLUTCHES

(71) Applicants: Hyundai Motor Company, Seoul (KR); Kia Corporation, Seoul (KR); Hyundai Wia Corporation, Changwon-si (KR)

(72) Inventors: Taewoo Lee, Suwon-si (KR); Jeong Won Song, Hwaseong-si (KR); Sung Keun Lim, Hwaseong-si (KR); JunSeok Park, Seoul (KR); Jong Chan Lee, Hanam-si (KR); Heon Kang, Hwaseong-si (KR)

(73) Assignees: Hyundai Motor Company, Seoul (KR); Kia Corporation, Seoul (KR); Hyundai Wia Corporation, Changwon-Si (KR)

(*) Notice: Subject to any disclaimer, the term of this patent is extended or adjusted under 35 U.S.C. 154(b) by 371 days.

(21) Appl. No.: 17/947,936

(22) Filed: Sep. 19, 2022

(65) Prior Publication Data
US 2023/0147926 A1  May 11, 2023

(30) Foreign Application Priority Data
Nov. 9, 2021 (KR) .................. 10-2021-0152842

(51) Int. Cl.
*B60L 15/20* (2006.01)
*F16D 48/06* (2006.01)

(52) U.S. Cl.
CPC .............. *B60L 15/20* (2013.01); *F16D 48/06* (2013.01); *B60L 2240/12* (2013.01); *B60L 2240/14* (2013.01); *B60L 2240/22* (2013.01); *B60L 2240/24* (2013.01); *B60L 2240/421* (2013.01); *B60L 2240/423* (2013.01); *B60L 2240/461* (2013.01); *B60L 2240/463* (2013.01); *B60L 2240/507* (2013.01); *F16D 2500/104* (2013.01);
(Continued)

(58) Field of Classification Search
None
See application file for complete search history.

(56) References Cited

U.S. PATENT DOCUMENTS 9,598,068 B2   3/2017 Maeda et al.
10,744,862 B2* 8/2020 Sekiguchi .............. B60K 25/00
(Continued)

FOREIGN PATENT DOCUMENTS

JP   2006-345677     12/2006
JP   5907142 B2      4/2016

*Primary Examiner* — Maceeh Anwari
*Assistant Examiner* — Charles Pall
(74) *Attorney, Agent, or Firm* — Morgan Lewis & Bockius LLP (57) ABSTRACT

A method of controlling an electric vehicle including twin clutches includes twin clutches for the electric vehicle driven by power of a drive motor and includes determining, by a clutch controller, whether a releasing condition for releasing engagement of the twin clutches is satisfied, controlling, by the clutch controller, the twin clutches to 0 torque when the releasing condition is satisfied, controlling the drive motor to 0 rpm by a vehicle controller when a torque applied to the twin clutches is less than a predetermined torque, and controlling the drive motor to 0 torque when a speed of the drive motor is less than a predetermined speed.

16 Claims, 4 Drawing Sheets

(52) U.S. Cl.
CPC ............... *F16D 2500/1064* (2013.01); *F16D 2500/3027* (2013.01); *F16D 2500/3065* (2013.01); *F16D 2500/3067* (2013.01); *F16D 2500/3115* (2013.01)

(56) References Cited

U.S. PATENT DOCUMENTS

| | | | | |
|---|---|---|---|---|
| 2003/0183431 | A1* | 10/2003 | Cikanek | B60W 10/06 |
| | | | | 180/65.6 |
| 2011/0165992 | A1* | 7/2011 | Ueno | B60K 6/365 |
| | | | | 180/65.265 |
| 2014/0222273 | A1* | 8/2014 | Banker | B60W 10/02 |
| | | | | 180/65.265 |
| 2015/0166064 | A1* | 6/2015 | Mitsuyasu | F16H 61/21 |
| | | | | 701/53 |
| 2016/0257221 | A1* | 9/2016 | Aiki | B60L 15/2036 |
| 2016/0303996 | A1 | 10/2016 | Sponheimer et al. | |
| 2017/0282904 | A1* | 10/2017 | Morita | B60K 6/387 |
| 2019/0092157 | A1 | 3/2019 | Sekiguchi et al. | |
| 2021/0086611 | A1* | 3/2021 | Inoh | B60K 1/02 |
| 2021/0094531 | A1* | 4/2021 | Miyamoto | B60W 10/02 |
| 2021/0323402 | A1* | 10/2021 | Stock | B01J 8/006 |

\* cited by examiner

APPARATUS AND METHOD FOR CONTROLLING ELECTRIC VEHICLE INCLUDING TWIN CLUTCHES

CROSS-REFERENCE TO RELATED APPLICATION

The present application claims priority to Korean Patent Application No. 10-2021-0152842 filed on Nov. 9, 2021, the entire contents of which is incorporated herein for all purposes by this reference.

BACKGROUND OF THE PRESENT DISCLOSURE

Field of the Present Disclosure

The present disclosure relates to an apparatus and method for controlling a twin clutch device for an electric vehicle. More particularly, the present disclosure relates to an apparatus and method for controlling twin clutches applied to an electric vehicle.

Description of Related Art

In general, a rear-wheel drive vehicle is a vehicle that shifts power generated from a driving source through a transmission and transmits it to a rear wheel axle through a propeller shaft and is easy to drift due to a small rotation radius, and because the mass center moves toward the rear wheel during rapid acceleration if handling performance is good, the ground force is improved as acceleration increases.

Furthermore, a four-wheel drive (4WD) or all-wheel drive (AWD) vehicle distributes power generated from a driving source to the four wheels to increase torque of each wheel, it has a merit of excellent driving performance on an uneven road, snowy, icy, or muddy road, etc.

In the present way, the rear-wheel drive vehicle, the 4WD vehicle, and the AWD vehicle may be provided with a hydraulic pressure clutch device for distributing a driving torque from a driving source to the rear wheels or all wheels, and such a hydraulic pressure clutch device may be provided on a drive line between a front wheel axle or the rear wheel axle, or on a rear wheel axle.

In recent rear-wheel drive, four-wheel drive, and AWD vehicles, to improve handling and traction performance, twin clutches are applied to independently control the power of a driving source by installing left and right clutches inside the rear axle, respectively.

Research is being conducted to improve an energy efficiency of the electric vehicle by releasing the engagement of the clutches when the electric vehicle to which the twin clutches are applied is coasting at high speed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control method of an electric vehicle including twin clutches having advantages of improving the energy efficiency by releasing engagement of the clutches when the electric vehicle to which the twin clutches are applied coasts.

A method of controlling an electric vehicle including twin clutches according to various exemplary embodiments of the present disclosure is a method of controlling an electric vehicle including twin clutches for the electric vehicle driven by power of a drive motor and includes determining, by a clutch controller, whether a releasing condition for releasing engagement of the twin clutches is satisfied, controlling, by the clutch controller, the twin clutches to 0 torque when the releasing condition is satisfied, controlling the drive motor to 0 revolutions per minute (rpm) by a vehicle controller when a torque applied to the twin clutches is less than a predetermined torque, and controlling the drive motor to 0 torque when a speed of the drive motor is less than a predetermined speed.

The method of controlling the electric vehicle including the twin clutches according to various exemplary embodiments of the present disclosure may further include controlling, by the vehicle controller, to synchronize the speed of the drive motor with a speed of a drive wheel of the vehicle when the torque applied to the twin clutches is greater than or equal to the predetermined torque after controlling the twin clutches to 0 torque.

The releasing condition may be satisfied when the vehicle is in a high-speed running state, excluding an accelerated running state of the vehicle, excluding a braking state of the vehicle, and excluding a turning running state of the vehicle.

The turning running state may indicate that a lateral G of the vehicle is less than or equal to a predetermined acceleration, a steering angle of a steering wheel is less than or equal to a predetermined angle, or a yaw rate is less than or equal to a predetermined value.

The method of controlling the electric vehicle including the twin clutches according to various exemplary embodiments of the present disclosure may further include determining whether an engagement condition for engaging the twin clutches is satisfied, synchronizing the speed of the drive motor and a speed of a drive wheel when the engagement condition is satisfied, and applying an engagement torque for engaging the twin clutches when the speed of the drive motor and the speed of the drive wheel are synchronized.

The applying of the engagement torque may include applying the engagement torque for engaging the twin clutches completely to the twin clutches, when a speed difference between the speed of the drive motor and the speed of the drive wheel is less than a predetermined speed.

The clutch controller may apply a preliminary engagement torque smaller than the engagement torque to the twin clutches when the speed difference between the speed of the drive motor and the speed of the drive wheel is greater than or equal to the predetermined speed.

The engagement condition may be satisfied when the vehicle is in a state where a turning running is required, or the vehicle is running at a low speed, is accelerating, or is braking.

Various aspects of the present disclosure are directed to providing an apparatus of controlling an electric vehicle including twin clutches configured to selectively cut off power supplied from a drive motor to a pair of drive wheels, a driving information detector configured to detect driving information of the vehicle, a vehicle controller configured to control the drive motor provided in the vehicle, and a clutch controller configured to control the twin clutches to 0 torque when a releasing condition for releasing engagement of the twin clutches is satisfied based on the driving information, control the drive motor to 0 rpm through the vehicle controller when a torque applied to the twin clutches is less than a predetermined torque, and control the drive motor to 0 torque through the vehicle controller when a speed of the drive motor is less than a predetermined speed.

The clutch controller may be configured to control to synchronize the speed of the drive motor with a speed of the drive wheels through the vehicle controller when the torque applied to the twin clutches is greater than or equal to the predetermined torque after controlling the twin clutches to 0 torque.

The releasing condition may be satisfied when the vehicle is in a high-speed running state, excluding an accelerated running state of the vehicle, excluding a braking state of the vehicle, and excluding a turning running state of the vehicle.

The turning running state may indicate that a lateral G of the vehicle is less than or equal to a predetermined acceleration, a steering angle of a steering wheel is less than or equal to a predetermined angle, or a yaw rate is less than or equal to a predetermined value.

When an engagement condition for engaging the twin clutches is satisfied while the vehicle is coasting, the clutch controller may be configured to synchronize the speed of the drive motor and a speed of drive wheel and apply an engagement torque for engaging the twin clutches when the speed of the drive motor and the speed of the drive wheel are synchronized.

When the engagement torque is applied to the twin clutches, the clutch controller is configured to apply the engagement torque for engaging the twin clutches completely to the twin clutches, when a speed difference between the speed of the drive motor and the speed of the drive wheel is less than a predetermined speed.

The clutch controller may apply a preliminary engagement torque smaller than the engagement torque to the twin clutches when the speed difference between the speed of the drive motor and the speed of the drive wheel is greater than or equal to the predetermined speed.

The engagement condition may be satisfied when the vehicle is in a state where a turning running is required, or the vehicle is running at a low speed, is accelerating, or is braking.

According to the apparatus and method for controlling an electric vehicle including twin clutches according to various exemplary embodiments of the present disclosure as described above, it is possible to release engagement of the twin clutch during coasting of the electric vehicle to reduce the driving resistance and improve the energy efficiency of the vehicle through a cooperative control of the clutch controller and the vehicle controller.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, like reference numerals designate like elements throughout the specification.

Furthermore, since the size and thickness of each component shown in the drawings are arbitrarily shown for convenience of description, the present disclosure is not limited to those shown in the drawings, and the thickness is enlarged to clearly represent various parts and regions.

Hereinafter, a control method and apparatus for an electric vehicle including twin clutches according to various exemplary embodiments of the present disclosure will be described in detail with reference to the accompanying drawings.

Figure 1:
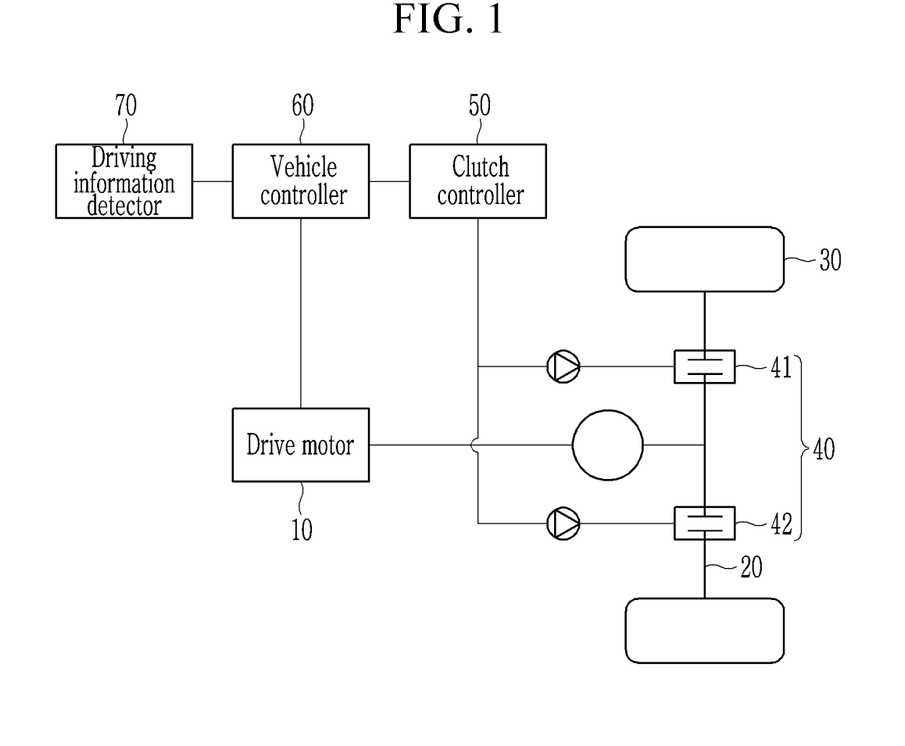
FIG. 1 is a schematic view exemplarily illustrating a configuration of a control device for an electric vehicle including twin clutches according to various exemplary embodiments of the present disclosure.

FIG. 1 is a schematic view exemplarily illustrating a configuration of a control apparatus for an electric vehicle including twin clutches according to various exemplary embodiments of the present disclosure.

As shown in FIG. 1, an electric vehicle to which twin clutches 40 according to various exemplary embodiments of the present disclosure are applied includes a drive motor 10, the twin clutches 40, a clutch controller 50, and a vehicle controller 60.

The drive motor 10 provides driving torque necessary for driving the vehicle by electrical energy, and the driving torque generated by the drive motor 10 is supplied to a drive wheel 30 or all wheels of the vehicle to drive the vehicle.

The twin clutches 40 are provided on an axle 20 mounted on the drive wheel 30, and include a first clutch 41 and a second clutch 42 provided on both sides of the axle 20 with the propeller shaft as the center. According to engagement and release of the twin clutches 40, the driving torque supplied from the drive motor 10 to the drive wheel 30 is supplied to the drive wheel 30 or blocked.

The clutch includes a clutch plate and a clutch disc, and the clutch plate and the clutch disc are engaged by hydraulic pressure generated by the hydraulic pump. In other words, the clutches are engaged by engaging the clutch plate and the clutch disk by the hydraulic pressure generated in the hydraulic pump. Conversely, when hydraulic pressure is not generated in the hydraulic pump, the engagement of the clutch plate and the clutch disk is released, and thus the engagement of the clutches is released.

In various exemplary embodiments of the present disclosure, the torque applied to each clutch may be controlled by independently adjusting the size of the hydraulic pressure applied to each clutch of the twin clutches 40. By independently controlling the torque applied to each clutch, the size of the driving torque distributed to the drive wheel 30 through the clutch is adjusted. The size of hydraulic pressure generated by the hydraulic pump and applied to each clutch may be mapped to a torque applied to each clutch. The torque applied to the clutch according to the size of the hydraulic pressure may be determined by an experiment and stored in the clutch controller 50 in advance.

The clutch controller 50 independently controls engagement and release of the twin clutches 40, and if necessary, distributes the driving torque supplied to the drive wheel 30 through the twin clutches 40 to allow the vehicle to stably drive when the vehicle turns or slides on any one wheel. In other words, the clutch controller 50 adjusts the torque of the drive wheels 30 provided on both sides of the axle 20 by adjusting the engagement force (or torque) of the clutches provided on both sides of the axle 20, so that the vehicle may be driven stably even if the vehicle turns or slides on any one wheel.

The vehicle controller 60 may control various parts necessary for driving of the vehicle including the drive motor 10, and may perform cooperative control with the clutch controller 50 if necessary.

The clutch controller 50 and the vehicle controller 60 may be implemented as an integrated or distributed (or separately) implemented. In the specification of the present disclosure, a case in which the clutch controller 50 and the vehicle controller 60 are distributed and implemented will be described as an example.

The clutch controller 50 and the vehicle controller 60 may be provided with at least one processors operating according to a predetermined program, and the predetermined program performs each step of a control method of an electric vehicle including the twin clutches 40 according to various exemplary embodiments of the present disclosure.

On the other hand, the electric vehicle including the twin clutches 40 according to the exemplary embodiment of the present disclosure includes a driving information detector 70 that detects driving information required for driving of the vehicle, and the driving information detected by the driving information detector 70 is transmitted to the clutch controller 50 and the vehicle controller 60. The driving information may include a vehicle speed, an opening of an accelerator pedal, an opening of a brake pedal, and a turning state of the vehicle.

To the present end, the driving information detector 70 may include a speed sensor configured for detecting the vehicle speed, an accelerator pedal sensor (APS) for detecting the opening of the accelerator pedal, and a brake pedal detecting sensor (BPS: brake pedal sensor) for detecting the opening of the brake pedal, and a steering angle sensor of a steering wheel for detecting the turning state of the vehicle (or a lateral acceleration sensor configured for measuring which is configured to measure a lateral G of the vehicle, or a yaw rate sensor which is configured to detect the yaw rate of the vehicle).

The accelerator pedal opening detected by the accelerator pedal sensor can be between 0% (driver not pressing the accelerator pedal) and 100% (driver not pressing the brake pedal) and brake pedal opening detected by the brake pedal sensor can be between 0% (driver not pressing the brake pedal) and 100% (driver not pressing the accelerator pedal).

Hereinafter, the operation of the electric vehicle including the twin clutches according to various exemplary embodiments of the present disclosure as described above will be described in detail with reference to the accompanying drawings.

Figure 2:
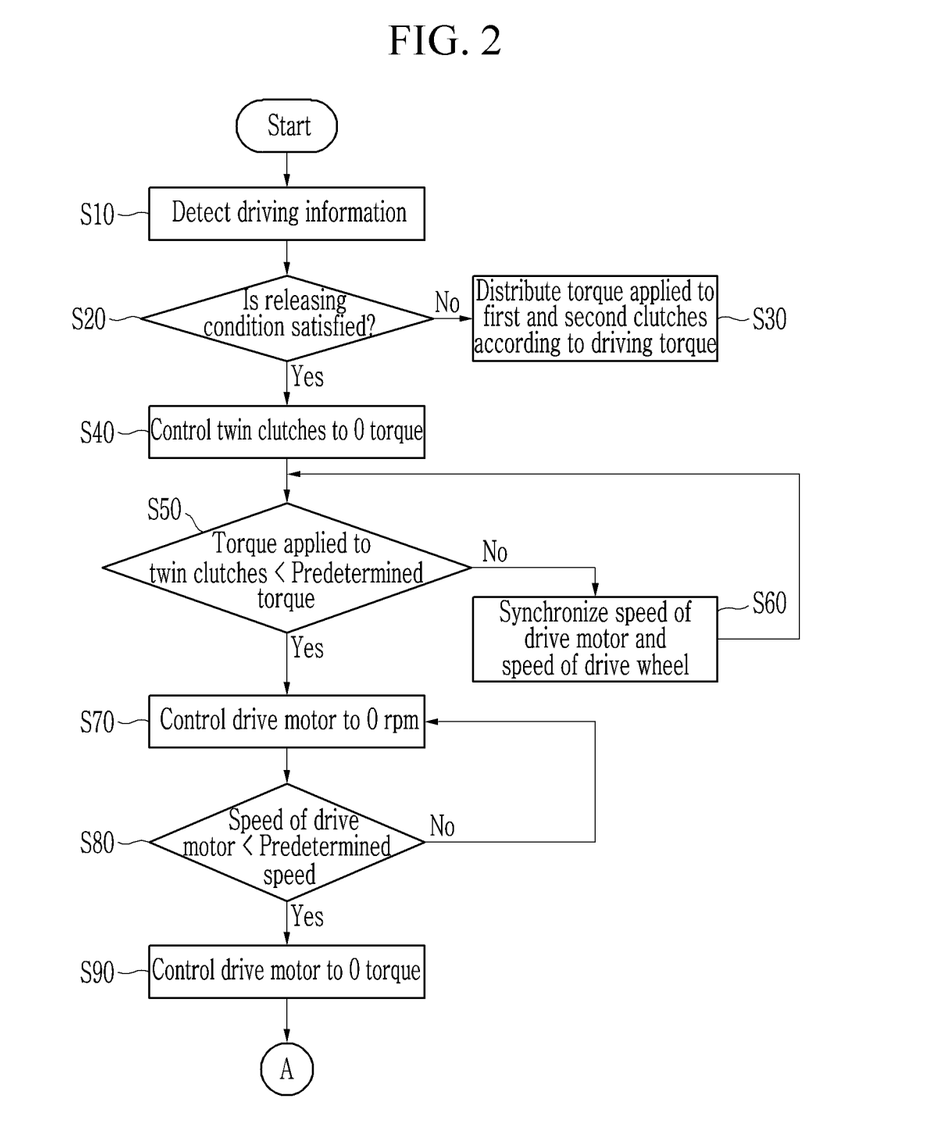
FIG. 2 and FIG. 3 are flowcharts illustrating a control method of an electric vehicle including twin clutches according to various exemplary embodiments of the present disclosure.
Figure 3:
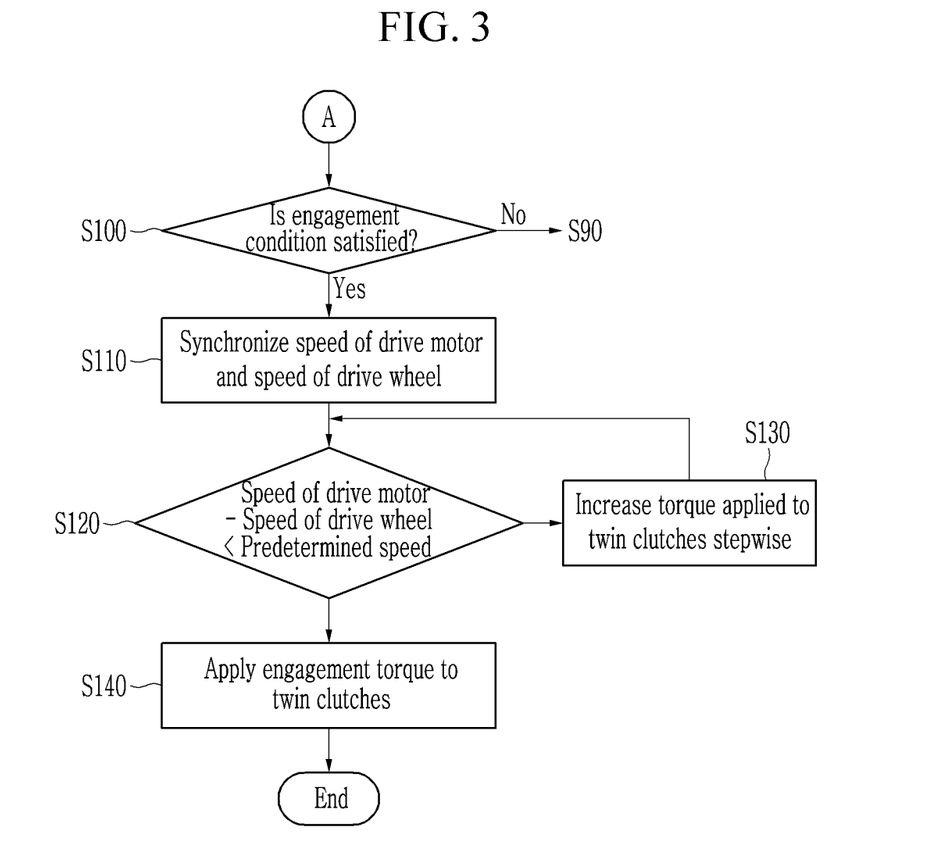
Figure 4:
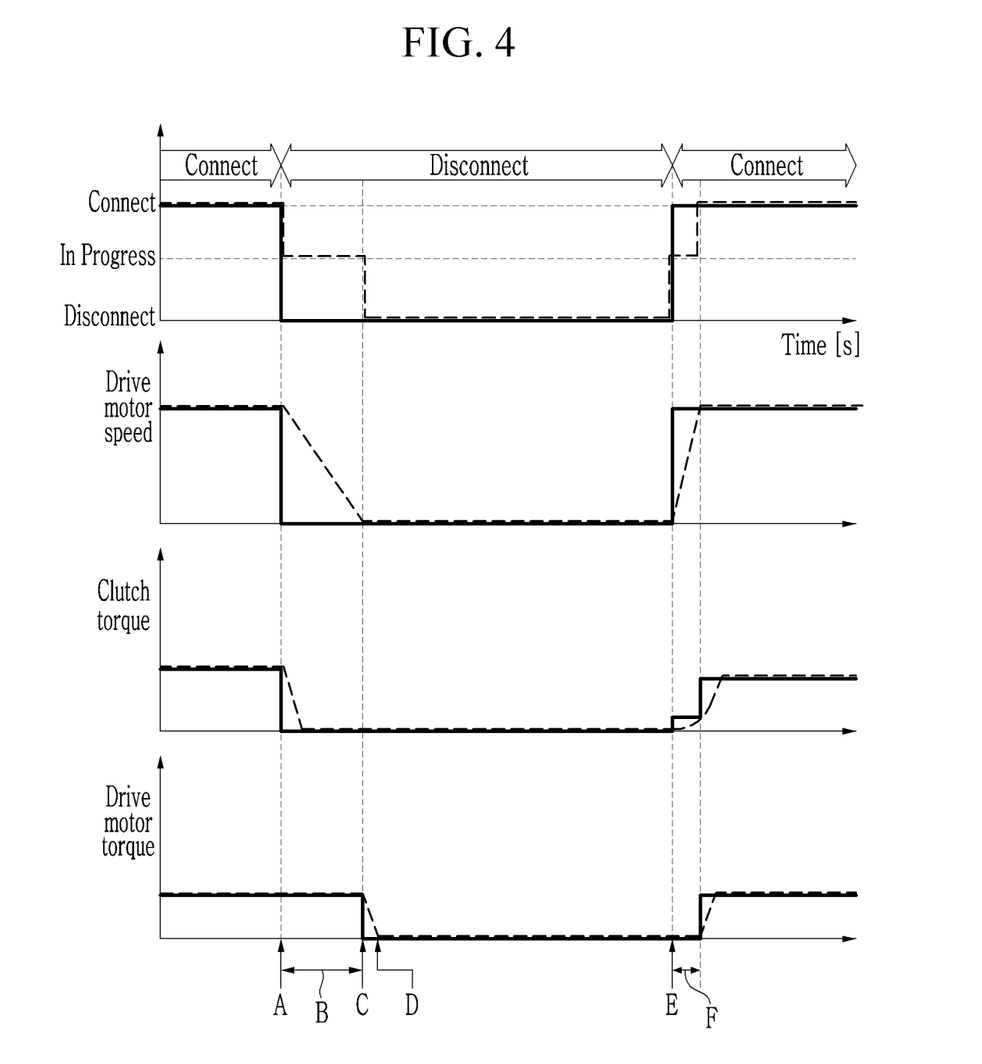
FIG. 4 is a graph for explaining an operation of an electric vehicle including twin clutches according to various exemplary embodiments of the present disclosure.

FIG. 2 and FIG. 3 are flowcharts illustrating a control method of an electric vehicle including twin clutches according to various exemplary embodiments of the present disclosure and FIG. 4 is a graph for explaining the operation of an electric vehicle including twin clutches according to various exemplary embodiments of the present disclosure.

FIG. 2 and FIG. 3, the driving information detector 70 detects driving information required for driving of the vehicle, and the detected driving information is transmitted to the vehicle controller 60 and the clutch controller 50 (S10). Here, because the driving information detected by the driving information detector 70 is the same as described above, a detailed description thereof will be omitted.

The clutch controller 50 determines whether a releasing condition for releasing the engagement of the twin clutches 40 is satisfied based on the driving information (S20).

The releasing condition is to be satisfied if the vehicle is in a high-speed running state, the vehicle speed is greater than or equal to a predetermined speed (e.g., 60 km/h), the vehicle is not in an accelerated running state, the vehicle is not in a braking state, and the vehicle is not in a turning running state. In other words, the releasing condition may be satisfied when the vehicle is in a high-speed running state, excluding the accelerated running state of the vehicle, excluding the braking state of the vehicle, and excluding the turning running state of the vehicle.

The high-speed running state of the vehicle may be determined from the speed of the vehicle detected by the speed sensor. For example, if the speed of the vehicle detected by the speed sensor is equal to or greater than the predetermined speed (for example, 60 km/h), it may be determined that the vehicle is in a high-speed running state.

The acceleration running state may be determined from an opening of the accelerator pedal detected by the accelerator pedal sensor. For example, if the accelerator pedal opening detected by the accelerator pedal sensor is 0%, it may be determined that the accelerator pedal is not in the accelerated running state.

The braking state of the vehicle may be determined from the opening of the brake pedal detected by the brake pedal sensor. For example, when the brake pedal opening detected by the brake pedal sensor is 0%, it may be determined that the brake pedal is not in a braking state.

If the lateral G of the vehicle detected by the lateral acceleration sensor is less than or equal to a predetermined acceleration, the steering angle of the steering wheel detected by the steering angle sensor is less than or equal to a predetermined angle, or the yaw rate of the vehicle detected by the yaw rate sensor is less than or equal to a predetermined value, it may be determined that the vehicle is not in the turning running state.

It may be determined whether the vehicle is in a coasting state from the high-speed running state, the accelerated running state, and the braking state. When the vehicle is in the coasting state, the energy efficiency of the vehicle may be improved by blocking the driving torque of the driving source (for example, the drive motor 10) and releasing the engagement of the twin clutches 40 to reduce running resistance.

However, when the vehicle is in the turning running state, the engagement of the twin clutches 40 is not released because the driving torque applied to each drive wheel 30 may be distributed differently.

If the releasing condition is not satisfied in step S20, the clutch controller 50 is configured to control the driving torque distributed to each drive wheel by adjusting the torque applied to the first clutch and the second clutch while the twin clutches 40 are engaged (S30).

If the releasing condition is satisfied in step S20, the clutch controller 50 is configured to control the twin clutches 40 to 0 torque (S40) (refer to the 'A' mark in FIG. 4). The 0 torque control of the clutch may mean controlling the hydraulic pressure applied from the hydraulic pump to the clutch to become a kiss point hydraulic pressure for engagement of the clutches. Here, the kiss point hydraulic pressure means that the actual torque applied to the clutch is 0 Nm while the hydraulic pressure applied to the clutch is controlled.

After the 0 torque control of the twin clutches 40, if the actual torque applied to the twin clutches 40 is equal to or greater than a predetermined torque (S50), the clutch controller 50 is configured to control the speed of the drive motor 10 to be synchronized with the speed of the drive wheel 30 via the vehicle controller 60 (S60) (refer to the 'B' mark in FIG. 4). In other words, the clutch controller 50 requests the vehicle controller 60 to control the speed of the drive motor 10 to be synchronized with the speed of the drive wheel 30.

Because the twin clutches 40 are engaged or released by the hydraulic pressure generated by the hydraulic pump, a time delay occurs between the command of the clutch controller 50 and the actual engagement or releasing of the clutches. Accordingly, when the torque applied to the twin clutches 40 is equal to or greater than the predetermined torque (before the engagement of the clutches is released), it means that the clutches are not completely released yet, and in the instant case, slip occurs in the twin clutches 40 when a difference occurs between the speed of the drive motor 10 and a wheel speed. Accordingly, it is possible to prevent slippage in the clutches by synchronizing the speed of the drive wheel 30 and the speed of the drive motor 10.

If the torque applied to the twin clutches 40 is less than the predetermined torque (in other words, when the engagement of the twin clutches is released), the clutch controller 50 operates the drive motor 10 through the vehicle controller 60 to 0 rpm. control (S70) (refer to the 'C' mark in FIG. 4). In other words, the clutch controller 50 requests the vehicle controller 60 so that the speed of the drive motor 10 becomes 0 rpm.

In other words, in various exemplary embodiments of the present disclosure, when the torque applied to the twin clutches 40 is equal to or greater than the predetermined torque (before the clutches are completely released), the speed of the drive motor 10 is controlled to be synchronized with the wheel speed, preventing slip from occurring in the clutches and when the torque applied to the twin clutches 40 is less than the predetermined torque (when the clutches are completely released), the drive motor 10 is controlled to 0 rpm.

When the speed of the drive motor 10 is less than the predetermined speed (S80), the vehicle controller 60 is configured to control the drive motor 10 to 0 torque (S90) (refer to 'D' in FIG. 4).

Accordingly, when the torque applied to the clutch is less than the predetermined torque, the clutch controller 50 may determine that the engagement of the twin clutches 40 is released, and in the instant case, the drive motor 10 is controlled to 0 torque by the vehicle controller 60, so that the vehicle coasts.

Meanwhile, while the releasing condition of the twin clutches 40 is satisfied and the vehicle is coasting, the clutch controller 50 satisfies the engagement condition for engaging the clutches based on the driving information detected by the driving information detector 70 (S100).

In other words, when the clutches need to be engaged while the vehicle is coasting, the engagement condition may be satisfied, for example, when the vehicle is in a state where a turning running is required, or the vehicle is running at a low speed, is accelerating, or is braking. In other words, the engagement condition may be satisfied if any one of the releasing conditions is not satisfied.

When the lateral G of the vehicle detected by the lateral acceleration sensor is greater than or equal to the predetermined acceleration, the steering angle of the steering wheel detected by the steering angle sensor is greater than or equal to the predetermined angle, or the yaw rate of the vehicle detected by the yaw rate sensor is greater than or equal to the predetermined value, it may be determined that the turning driving is necessary.

A state in which the vehicle should travel at a low speed may be determined from the speed of the vehicle detected by the speed sensor. For example, when the speed of the vehicle detected by the speed sensor is less than or equal to a predetermined speed (for example, 60 km/h), it may be determined that the vehicle is in a low speed running state.

Because the acceleration running state and the braking state are the same as in the case of the above-described releasing condition, a detailed description thereof will be omitted.

When the engagement condition is satisfied in step S100, the clutch controller 50 requests the vehicle controller 60 to synchronize the speed of the drive motor 10 and the speed of the drive wheel 30 (S110) (refer to the 'E' mark in FIG. 4).

If the speed difference between the speed of the drive motor 10 and the speed of the drive wheel 30 is equal to or greater than a predetermined speed (S120) (or if the speed of the drive motor and the speed of the drive wheel are not synchronized), the clutch controller 50 increases the torque applied to the twin clutches 40 stepwise (S130) (refer to the 'F' mark in FIG. 4). In other words, if the speed difference between the speed of the drive motor 10 and the speed of the drive wheel 30 is equal to or greater than the predetermined speed, the clutch controller 50 applies a preliminary engagement torque smaller than the engagement torque to the clutches.

Furthermore, when the speed difference between the speed of the drive motor 10 and the speed of the drive wheel 30 is less than the predetermined speed (or when the speed of the drive motor and the speed of the drive wheel are synchronized), the clutch controller 50 is configured to control to apply the engagement torque for engaging the twin clutches completely to the twin clutches (S140).

If the engagement torque is momentarily applied to the clutches in a state in which the clutches is released, overshoot may occur and a problem may occur in that the engagement torque cannot be stably applied to the clutches. Therefore, by applying the preliminary engagement torque to the clutches before the engagement torque for complete engagement of the clutches is reached in a state in which the clutches are released, stable engagement of the clutches and responsiveness of engagement of the clutches may be secured.

When the clutches are engaged, the clutch controller 50 adjusts the torque (or hydraulic pressure) applied to the clutches so that an appropriate driving torque is distributed to both drive wheels according to the driving torque of the vehicle or the torque requested by the driver.

According to the control apparatus and method of the electric vehicle including the twin clutches 40 according to the exemplary embodiment of the present disclosure as described above, when the vehicle is in a steering state and not in a turning state, the engagement of the twin clutches 40 is released by doing so, it is possible to reduce the running resistance of the vehicle generated by the clutch engagement and reduce the power consumed by the drive motor 10. Accordingly, it is possible to improve the energy efficiency of the vehicle.

Furthermore, by releasing the engagement of the clutches through the cooperative control of the clutch controller 50 and the vehicle controller 60, it is possible to expand the coasting range of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a vehicle including twin clutches for the vehicle driven by power of a drive motor, wherein a torque applied to the twin clutches are independently controlled, and size of driving torque distributed to each drive wheel through the twin clutches are adjusted, the method comprising:

determining, by a clutch controller, whether a releasing condition for releasing engagement of the twin clutches is satisfied;

controlling, by the clutch controller, the twin clutches to 0 torque when the releasing condition is satisfied;

controlling the drive motor to 0 revolutions per minute (rpm) by a vehicle controller when the torque applied to the twin clutches is less than a predetermined torque; and controlling the drive motor to 0 torque when a speed of the drive motor is less than a predetermined speed, wherein the releasing condition is satisfied when the vehicle is in a high-speed running state, excluding an accelerated running state of the vehicle, excluding a braking state of the vehicle, and excluding a turning running state of the vehicle.

2. The method of claim 1, further including:
controlling, by the vehicle controller, to synchronize the speed of the drive motor with a speed of a drive wheel of the vehicle when the torque applied to the twin clutches is greater than or equal to the predetermined torque after controlling the twin clutches to 0 torque.

3. The method of claim 1, wherein the turning running state includes a state in which a lateral G of the vehicle is less than or equal to a predetermined acceleration, a steering angle of a steering wheel is less than or equal to a predetermined angle, or a yaw rate is less than or equal to a predetermined value.

4. The method of claim 1, further including:
determining whether an engagement condition for engaging the twin clutches is satisfied;
synchronizing the speed of the drive motor and a speed of a drive wheel when the engagement condition is satisfied; and
applying an engagement torque for engaging the twin clutches when the speed of the drive motor and the speed of the drive wheel are synchronized.

5. The method of claim 4, wherein the applying of the engagement torque includes applying the engagement torque for engaging the twin clutches completely to the twin clutches, when a speed difference between the speed of the drive motor and the speed of the drive wheel is less than a predetermined speed.

6. The method of claim 5, wherein the clutch controller is configured to apply a preliminary engagement torque smaller than the engagement torque to the twin clutches when the speed difference between the speed of the drive motor and the speed of the drive wheel is greater than or equal to the predetermined speed.

7. The method of claim 4, wherein the engagement condition is satisfied when the vehicle is in a state where a turning running is required, or the vehicle is running at a predetermined speed, is accelerating, or is braking.

8. The method of claim 1, wherein when the releasing condition is not satisfied, the clutch controller is configured to control the driving torque distributed to each drive wheel of the vehicle by adjusting the torque applied to a first clutch and a second clutch while the twin clutches are engaged.

9. An apparatus of controlling a vehicle, the apparatus comprising:
twin clutches configured to selectively cut off power supplied from a drive motor to a pair of drive wheels of the vehicle, wherein torque applied to the twin clutches are independently controlled, and size of driving torque distributed to each drive wheel through the twin clutches are adjusted;
a driving information detector configured to detect driving information of the vehicle;
a vehicle controller configured to control the drive motor provided in the vehicle; and
a clutch controller configured to control the twin clutches to 0 torque when a releasing condition for releasing engagement of the twin clutches is satisfied based on the driving information, control the drive motor to 0 revolutions per minute (rpm) through the vehicle controller when the torque applied to the twin clutches is less than a predetermined torque, and control the drive motor to 0 torque through the vehicle controller when a speed of the drive motor is less than a predetermined speed,
wherein the releasing condition is satisfied when the vehicle is in a high-speed running state, excluding an accelerated running state of the vehicle, excluding a braking state of the vehicle, and excluding a turning running state of the vehicle.

10. The apparatus of claim 9, wherein the clutch controller is further configured to control to synchronize the speed of the drive motor with a speed of the drive wheels through the vehicle controller when the torque applied to the twin clutches is greater than or equal to the predetermined torque after controlling the twin clutches to 0 torque.

11. The apparatus of claim 9, wherein the turning running state includes a state in which a lateral G of the vehicle is less than or equal to a predetermined acceleration, a steering angle of a steering wheel is less than or equal to a predetermined angle, or a yaw rate is less than or equal to a predetermined value.

12. The apparatus of claim 9, wherein when an engagement condition for engaging the twin clutches is satisfied while the vehicle is coasting, the clutch controller is configured to synchronize the speed of the drive motor and a speed of drive wheel and apply an engagement torque for engaging the twin clutches when the speed of the drive motor and the speed of the drive wheel are synchronized.

13. The apparatus of claim 12, wherein when the engagement torque is applied to the twin clutches, the clutch controller is configured to apply the engagement torque for engaging the twin clutches completely to the twin clutches, when a speed difference between the speed of the drive motor and the speed of the drive wheel is less than a predetermined speed.

14. The apparatus of claim 13, wherein the clutch controller is configured to apply a preliminary engagement torque smaller than the engagement torque to the twin clutches when the speed difference between the speed of the drive motor and the speed of the drive wheel is greater than or equal to the predetermined speed.

15. The apparatus of claim 12, wherein the engagement condition is satisfied when the vehicle is in a state where a turning running is required, or the vehicle is running at a low speed, is accelerating, or is braking.

16. The apparatus of claim 9, wherein when the releasing condition is not satisfied, the clutch controller is configured to control the driving torque distributed to each drive wheel by adjusting the torque applied to a first clutch and a second clutch while the twin clutches are engaged.

* * * * *